United States Patent Office 2,841,469
Patented July 1, 1958

2,841,469

PLUTONIUM CARRIER METATHESIS WITH ORGANIC REAGENT

Stanley G. Thompson, Richmond, Calif., assignor to the United States of America as represented by the United States Atomic Energy Commission No Drawing. Application July 17, 1947
Serial No. 761,747

13 Claims. (Cl. 23—14.5)

This invention relates to a method for separating plutonium from radioactive fission products and more specifically is concerned with a method for concentrating plutonium during separation from radioactive fission products.

The word "plutonium" as used in this specification and claims refers to the element with the atomic number of 94 and to compositions containing this element unless the context indicates the elemental or metallic form.

Plutonium is usually produced by the reaction of neutrons with uranium, a reaction ordinarily carried out in a pile. The uranium mass as removed from the pile is comprised principally of unreacted uranium, but there are very small amounts of neptunium, plutonium and radioactive fission products present. Neptunium is radioactive and has a half-life of only 2.3 days, decaying to plutonium by beta-ray emission. Because of this short half-life, substantially all of the neptunium in the uranium mass may be converted to plutonium by suitable aging of the mass for a few weeks.

A common method of separating the plutonium from the uranium and radioactive fission products contained in the uranium mass following aging, is the bismuth phosphate-lanthanum fluoride precipitation process. This process may be arbitrarily divided into four steps; (1) Extraction, in which plutonium and some fission products are separated from uranium and the bulk of the fission products; (2) Decontamination, in which plutonium is separated from the remaining fission products; (3) Concentration, in which the ratio of plutonium-to-carrier is reduced sufficiently that the plutonium may be precipitated directly from solution; (4) Isolation, in which the pluotnium solution is further concentrated.

In brief, the extraction step is carried out by dissolving the suitably aged neutron-irradiated uranium mass in an aqueous nitric acid solution, then forming a carrier precipitate of bismuth phosphate in the solution and separating the bismuth phosphate carrier precipitate, which contains quadrivalent plutonium and certain phosphate-insoluble fission products from the solution, leaving the uranium and the bulk of the fission products dissolved in the supernatant fluid. The decontamination step is then carried out by dissolving this precipitate in an aqueous nirtic acid solution, oxidizing the quadrivalent plutonium to the hexavalent state, and then precipitating the phosphate-insoluble fission products by forming and separating a bismuth phosphate carrier precipitate. The plutonium is then reduced from the +6 to the +4 valence state and separated from solution by forming and separating a bismuth phosphate carrier precipitate from the solution. The decontamination step forms a complete cycle and this cycle may be repeated as many times as necessary in order to increase the separation factor. In order to increase the ratio of plutonium to carrier the concentration step is then carried out. This comprises essentially the following steps. The bismuth phosphate carrier containing plutonium is dissolved in nitric acid, the plutonium is oxidized to the hexavalent state and the bulk of the bismuth phosphate is removed from solution by diluting and adding phosphoric acid so that a bismuth phosphate precipitate is formed and this precipitate is separated from the solution. The plutonium contained in said solution is then reduced to the quadrivalent state and the lanthanum fluoride carrier precipitate is then formed and separated from the solution carrying with it the plutonium. This lanthanum fluoride carrier precipitate containing the plutonium is then metathesized to form a lanthanum hydroxide precipitate containing plutonium and this precipitate is dissolved in acid to furnish an acid solution containing plutonium in such concentration that it may be precipitated directly from solution in the final step of the process, known as the isolation step.

The bismuth phosphate-lanthanum fluoride separation process is remarkably successful but is not without its limitations. One of these limitations is the large dilute acid-to-plutonium ratio in which the bismuth phosphate-plutonium carrier precipitations are carried out. The bismuth phosphate-plutonium carrier precipitate is difficultly soluble in nitric acid and it requires a large amount of concentrated nitric acid to dissolve the bismuth phosphate carrier cake. This volume of solution is then greatly increased by the necessity of carrying out the plutonium precipitation step from the solution as not appreciably greater than 1 N acid concentration is increased much above 1 N, there is strong tendency for the acid to oxidize the plutonium to the hexavalent state, in which valence state plutonium is soluble in the phosphate solution. Because of the difficulty of dissolving the bismuth phosphate and the necessity of diluting the acid solution to approximately 1 N, it is impossible to concentrate the plutonium as long as it is carried with a bismuth phosphate carrier, since the amount of acid solution from which a bismuth phosphate-plutonium precipitation step is carried out is approximately the same as the amount of acid solution in the preceding step.

The present method of concentrating plutonium by changing from a bismuth phosphate to a lanthanum fluoride carrier also introduces certain limitations on the process. The fluorides and free hydrofluoric acid involved in this step are quite corrosive and greatly shorten the life of process vessels as well as increasing the health hazard to operating personnel. The flocculent character of the lanthanum fluoride precipitate increases the difficulty of centrifugation in large-scale operations. The necessity of changing from a bismuth phosphate carrier to a lanthanum fluoride carrier and of metathesizing the lanthanum fluoride carrier to the hydroxide introduces added steps over the ideal separation process and if some of these steps could be eliminated the efficiency of the overall process would be increased.

One object of this invention is to effect the concentration of plutonium as a salt in an aqueous solution.

An additional object of this invention is to effect an improvement in the bismuth phosphate-lanthanum fluoride plutonium separation process whereby the ratio of plutonium to plutonium carrier may be greatly increased in the decontamination and concentration steps of that process.

Still other objects of this invention will be apparent from the description and claims which follow.

I have discovered that a bismuth phosphate carrier precipitate containing plutonium (obtained by precipitating bismuth phosphate from an aqueous solution containing plutonium ions) may be dissolved in an aqueous medium containing an alkali metal hydroxide and, an organic reagent which will form a water-soluble complex with bismuth and plutonium, and that a precipitate comprising a mixture of bismuth and plutonium oxides or hydroxides in which the plutonium to bismuth ratio is as high as 1 to 3 may then be formed in and separated from this solution by digesting this solution at elevated temperatures, by dilution, or both. This mixed bismuth-plutonium precipitate may then be dissolved in a small quantity of an aqueous inorganic acid solution to furnish a solution from which the plutonium may be precipitated without a carrier. Broadly, the process of this invention comprises the method of converting a bismuth phosphate precipitate containing plutonium into a plutonium compound more soluble in acid, which comprises dissolving said bismuth phosphate-plutonium carrier in an aqueous solution containing an alkali metal hydroxide and a water-soluble material of the group consisting of: polyhydric alcohols having hydroxy groups on adjacent carbon atoms; poly-(β-hydroxy-alkyl)amines; and α-hydroxycarboxylic acids; and mixtures thereof, then digesting said solution whereby a precipitate containing plutonium is formed.

While there are many variations of this invention and its uses are numerous, there is a preferred embodiment of this invention which may be adapted to the bismuth phosphate-lanthanum fluoride-plutonium separation process to effect a considerable improvement on that process. In this embodiment a bismuth phosphate carrier precipitate containing plutonium phosphate is introduced into an aqueus solution, in a ratio of about 30 g. of bismuth per liter of solution, said solution containing potassium hydroxide in a concentration of between about 2 M and 10 M and glycerol in a concentration between about 0.5 M and 6 M, whereby said precipitate is dissolved. This solution is then digested for a period of several hours at a temperature between about 50° and 100° C. until a precipitate containing bismuth and plutonium oxides or hydroxides forms and separates from said solution. The precipitate thus obtained is readily soluble in a small amount of nitric acid, and forms a relatively concentrated plutonium solution.

The process of this invention is quite elastic and there is a considerable range of the permissible concentrations of the various reagents employed in the dissolution step of this invention. The range of concentrations and time and temperature conditions are interdependent and there are no independent critical limits on these factors; however, experimentation has shown certain optimum concentrations and certain limits upon the concentration of any one reagent in relation to concentrations of the other reactants. The optimum conditions for dissolving a bismuth phosphate precipitate containing plutonium, wherein the bismuth phosphate-to-plutonium ratio ranges from approximately 200:3 to 200:1, is to dissolve a bismuth phosphate, plutonium-containing precipitate in a KOH-glycerol solution so that the ratio of bismuth to solution is about 30 g. bismuth per liter of solution. The optimum concentrations of KOH and glycerol are 3.5 M KOH and 2 M glycerol. While the aforementioned concentrations form one optimum set of conditions good results can be obtained where the various concentrations are varied interdependently from these optimum values, as shown by the data contained in the following tables.

TABLE I

Solubility of bismuth phosphate in various potassium hydroxide-glycerol solutions at 25° C.

| Exp. No. | Concn. of KOH, M | Concn. of glycerol, M | Solubility of BiPO₄ (g. Bi/l) |
|---|---|---|---|
| 1 | 10 | 0.55 | Greater than 30. |
| 2 | 9.2 | 1.0 | Do. |
| 3 | 8.3 | 1.5 | Do. |
| 4 | 7.4 | 2.0 | Do. |
| 5 | 4.0 | 5.0 | Do. |
| 6 | 3.0 | 6.0 | Do. |
| 7 | 2.0 | 7.0 | Less [1] than 30. |
| 8 | 1.0 | 8.0 | Do. |

[1] In experiments 7 and 8 in order to effect solution, it was necessary to make the solutions 2.5 M and 2.0 M in KOH, respectively.

TABLE II

Stability of potassium hydroxide-glycerol solutions of bismuth phosphate

[Concentration of Bi=45 g./l.]

| Exp. No. | Concn. of KOH, M | Concn. of glycerol, M | Effect of standing overnight at— 23° C. | 35° C. | 55–60° C. |
|---|---|---|---|---|---|
| 1 | 2.0 | 1.0 | Bismuth phosphate did not dissolve. | | |
| 2 | 2.0 | 1.5 | Clear soln | Slight pptn | Pptn.[1] |
| 3 | 2.0 | 2.0 | do | Clear soln | Pptn.[1] |
| 4 | 2.0 | 3.0 | do | do | Pptn.[1] |
| 5 | 3.5 | 1.0 | Very slight pptn. | Pptn | Pptn. |
| 6 | 5.0 | 1.0 | Pptn | Pptn | Pptn. |
| 7 | 3.5 | 2.0 | Clear soln | Clear soln | Pptn.[3] |
| 8 | 5.0 | 2.0 | do | do [2] | Pptn.[3] |
| 9 | 3.5 | 3.0 | do | Clear soln | Pptn.[3] |
| 10 | 5.0 | 3.0 | do | do [2] | Pptn.[3] |

[1] Amount of precipitate decreased with increasing concentration of glycerol.
[2] A slight insignificant gray precipitation formed.
[3] The precipitate at 5 M KOH was darker colored and larger than the precipitate at 3.5 M KOH.

TABLE III

Solubility of bismuth phosphate in potassium hydroxide-glycerol solutions

[Conditions: 3.5 M KOH and 2 M Glycerol.]

| Exp. No. | Concn. of Bi (g./l.) | At 23° C. | At 50° C. |
|---|---|---|---|
| 1 | 30 | Clear solution | Clear solution. |
| 2 | 35 | do | Do. |
| 3 | 40 | do | Do. |
| 4 | 45 | do | Do.[1] |
| 5 | 50 | do | Do.[1] |
| 6 | 80 | do | Ppt.[2] |
| 7 | 100 | Ppt | Ppt. |

[1] The solutions in experiments 4 and 5 were seeded with the precipitate from experiment No. 6. The ppt. dissolved in the case of experiment No. 4 while no apparent solution or precipitate occurred in experiment No. 5.
[2] Analysis of the clear supernatant liquid showed 51.7 g. of Bi/l.

As shown by the data contained in the foregoing tables, the concentration of the reactants should be maintained within the following broad limits: 3 to 10 M potassium hydroxide; 0.5 to 6 M glycerol; and less than 80 grams of bismuth per liter of solution. The plutonium to bismuth phosphate ratio is not critical in the operation of the process of this invention, and this process is capable of efficient operation where the plutonium to bismuth phosphate ratio is much larger than the present 0.65 lb. of plutonium per 43 lbs. of bismuth phosphate ratio, currently used in the bismuth phosphate-lanthanum fluoride process.

Dissolution of the bismuth phosphate-plutonium carrier precipitate takes place best at temperatures not greatly in excess of 50° C., and is ordinarily carried out at room temperature. The limitation on temperature is based on the decreasing solubility of plutonium in a KOH-glycerol solution as the temperature is elevated. This is illustrated by the data in the following table.

TABLE IV

*Effect of temperature on the solubility of plutonium in potassium hydroxide-glycerol-bismuth phosphate solutions*

[Conditions: 3.5 M KOH, 2 M glycerol; 30 g. of Bi/l., 140 mg. of Pu/l.; 0.2 M AsO₂; and 2 hour digestion.]

| Temperature of Digestion, °C. | Plutonium solubility, mg./ml. |
|---|---|
| 40 | 182 |
| 50 | 18.4 |
| 60 | 1.7 |
| 70 | 0.8 |
| 80 | 0.6 |

If the concentrations of bismuth, potassium hydroxide and glycerol are the optimum as described above, the time required for solution is ordinarily quite short and may be readily determined by inspection. Agitation may be desirable to shorten the dissolution time, but is not essential to effect solution.

There are two methods of forming a precipitate of plutonium hydroxide in the solution in which the bismuth phosphate-plutonium carrier has been dissolved. The preferable method is to digest the solution at temperatures between about 50° and 100° C. for several hours. This digestion period causes a precipitate to form which contains on the average about 3 to 5 times as many mols of bismuth as of plutonium where the original plutonium-to-bismuth ratio in the bismuth phosphate carrier dissolved was about 3:200. The precipitate contains no phosphate and is a mixed bismuth-plutonium hydroxide or oxide. The plutonium is carried practically quantitatively from solution by this precipitate; better than 99% under optimum conditions. An alternate method of causing a precipitation of bismuth-plutonium oxide is the dilution of said solution. Dilution with water may be used to effect the precipitation either alone or as a factor in connection with the digestion method described above. Thus, an effective way of forming the precipitate in a solution, wherein the reactants are present in the following concentrations: 3.5 M potassium hydroxide, 2 M glycerol, 30 g. of bismuth per liter of solution; and 180 g. of plutonium per liter of solution, is to dilute the solution with water tenfold and to digest for one hour at 50° C. The precipitate formed by this procedure carries 99.7% of the plutonium from solution.

The presence of a suitable reducing agent for plutonium in the solution during digestion greatly decreases the solubility of the plutonium. Certain considerations are paramount in the choice of a reducing agent. Thus, a reducing agent cannot be employed which will reduce the glycerol present to the hydrocarbon or mono- or di-alcohol. A reduction of the bismuth ion present to metallic bismuth is highly undesirable and caution must be employed to avoid using a reducing agent which would convert the bismuth ion to metallic bismuth; furthermore it is desirable to avoid the use of such agents as would cause the bismuth ion to be oxidized to the bismuthate ion. The action of the reducing agent in decreasing the solubility of the plutonium has not been fully determined and I do not desire to be bound by any theory advanced as to its action. However, it is known that $Pu^{+4}$ may disproportionate into $Pu^{+6}$ and $Pu^{+3}$ in an alkaline solution. The hexavalent plutonium hydroxide is much more soluble than the quadrivalent or trivalent plutonium hydroxide and with these considerations in mind it is believed that the action of the reducing agent may be to reduce any $Pu^{+6}$ ion formed to the lower valence states and thus decrease the solubility of the plutonium hydroxides. Experiments have shown that reducing agents such as sodium hydrosulfite, sodium stannite and formaldehyde which have standard oxidation-reduction potentials in basic solutions greater than 0.90 electron volt reduced the bismuth ion to the metallic state. Sodium sulfide appeared to produce either metallic bismuth or bismuth sulfide. Hydrogen peroxide formed a potassium bismuthate. Reducing agents with oxidation-reduction potentials in basic solution of below 0.60 such as hydroxylamine, sodium sulfite and hydrazine appeared to have no effect. However, a reducing agent with an oxidation-reduction potential in basic solution within the range 0.8–0.6 E°, such as sodium arsenite, produced a very noticeable decrease in the plutonium solubility. The use of sodium arsenite resulted in only a trace of metallic bismuth in 16 hours. Where sodium arsenite is used as the reducing agent it is preferable to maintain the concentration between about 0.1 and 0.2 M since higher concentrations of arsenite apparently increase the tendency for bismuth to be reduced to the metallic state. It was found that 0.1 M arsenite concentration employed with the optimum concentrations of other reagents described above gave the best results. However, if the concentrations of the other reagents are varied, the concentration of the arsenite may also be varied. The effect of variations of arsenite is shown in the following tables.

TABLE V

*Effect of arsenite on the solubility of plutonium in potassium hydroxide-glycerol-bismuth phosphate solutions at 50° C.*

[Conditions: 3.5 M KOH; 2 M glycerol; 30 g. of Bi/l., and 290 mg. of Pu/l.

| Digestion time, hours | Product solubility, mg./l. | | | |
|---|---|---|---|---|
| | 0.05 M NaAsO₂ | 0.10 M NaAsO₂ | 0.2 M NaAsO₂ | 0.4 M NaAsO₂ |
| 1 | No ppt. | No ppt. | 40.8 | 16.8 |
| 2 | 35.3 | 29.4 | 12.5 | 7.7 |
| 3 | 34.9 | 18.3 | 7.5 | 6.4 |
| 4 | 16.3 | 5.2 | 2.6 | 2.6 |

TABLE VI

*Effect of arsenite on the solubility of plutonium in potassium hydroxide-glycerol-bismuth phosphate solutions at 75° C.*

[Conditions: 3.5 M KOH, 2 M glycerol, 30 g. of Bi/l.; 140 mg. of Pu/l.; and 2 hours digestion.]

| NaAsO₂ concn., M | Solubility of Pu, mg./l. |
|---|---|
| 0.0 | 2.1 |
| 0.05 | 0.5 |
| 0.1 | 0.5 |
| 0.2 | 0.3 |

The effects of various contaminants upon this process were studied at some length and it was determined that the only contaminants ordinarily encountered in plant operation which had much effect upon the efficiency of this process were iron and chromium. The presence of the $Fe^{+3}$ ion in concentrations as low as 0.025 M and $Cr^{+3}$ ion in concentrations as low as 0.001 M seriously increased the solubility of plutonium in the digested solution. Should either of these ions be present in the solution from which the plutonium is to be precipitated, in concentrations as high as these, it may be necessary to reduce the concentration of these contaminants by suitable methods. Concentrations of contaminants as large as these, however, are seldom encountered in the process of this operation. It should be noted that the iron present in the bismuth phosphate precipitate dissolves in the potassium hydroxide-glycerol solution, due presumably either to the formation of a colloid or an iron phosphate complex. The effect of the presence of these contaminants may also be lessened by an increase in the concentration of reducing agent in the solution. The effect of various concentrations of these two contaminants is illustrated by the data in the following table.

TABLE VII

*Effect of chromium and iron on the precipitation of plutonium from potassium hydroxide-glycerol-bismuth phosphate solutions.*

[Original conditions: 3.5 M KOH, 2 M glycerol, 30 g. of Bi as BiPO₄ per 1. of solution, 0.1 M NaAsO₂, 150-160 mg. of Pu per 1.]

| Concentrations, M | | Solubility of plutonium mg/l. after digestion at 75° C. for— | | |
|---|---|---|---|---|
| Fe (III) | Cr (III) | 2 hours | 3 hours | 4 hours |
| 0 | 0 | 1.0 | | |
| 0.025 | 0 | 27 | [2] 17 | [3] 1.6 |
| 0.025 | 0.0001 | 18 | [2] 18 | [3] 3.4 |
| 0.025 | 0.001 | 160 | | |
| 0.025 | 0.01 | 160 | | |
| 0 | 0 | [1] 14.4 | | |
| 0.0014 | 0 | [1] 30.6 | | |

[1] Digestion for 3.25 hours at 50° C.
[2] Concentration of PO₄⁻³ was 0.5 M.
[3] Concentration of AsO₂⁻ was 0.5 M.

The bismuth-plutonium hydroxide precipitate may be separated from solution by any of the usual methods such as filtration, centrifugation or decantation. The centrifugation properties of this precipitate are satisfactory and are considerably better than those of such a precipitate as lanthanum fluoride. Following separation of the bismuth-plutonium hydroxide precipitate it is desirable to wash the precipitate in order to remove any phosphate ions contained therein. Peptization may be avoided by washing the precipitate with a potassium hydroxide solution with a concentration greater than about 5 M potassium hydroxide and preferably about 7 M potassium hydroxide. However, should peptization occur the dissolved precipitate may be reprecipitated by heating, thus avoiding any losses. Following the first wash with potassium hydroxide solution the precipitate may be given several water washes. The precipitate dissolves readily in a relatively small amount of nitric acid solution to furnish a solution in which plutonium is present in sufficient concentration to permit direct precipitation of the plutonium.

Now that the preferred embodiment of this invention has been described it may be further illustrated by the following example.

EXAMPLE I

Forty-three lbs. of bismuth phosphate containing 0.64 lb. of plutonium phosphate was dissolved in 118 gals. of an aqueous solution which was 3.5 M in potassium hydroxide and 2 M in glycerol, to give a bismuth concentration in the solution of 30 g./l. The solution was then made 0.1 M in sodium arsenite and heated to 75° C., at which temperature it was maintained for two hours. A precipitate formed during the digestion period and it was separated from the solution by centrifugation. The precipitate was washed with 7 gals. of 7 M potassium hydroxide followed by two 7-gal. water washes. The said precipitate was then dissolved in 24 lbs. of 60% nitric acid.

This modification described above may be incorporated in the standard bismuth phosphate-lanthanum fluoride separation process to replace any step in that process in which a bismuth phosphate precipitate containing plutonium is formed and redissolved in an acid solution. This embodiment may be very effectively used in said process to replace the cross-over and metathesis steps employed in the present bismuth phosphate lanthanum fluoride process whereby a bismuth phosphate carrier containing plutonium is dissolved in a nitric acid solution and the plutonium then precipitated with a lanthanum fluoride carried, said lanthanum fluoride carrier subsequently being metathesized to a lanthanum hydroxide carrier, which is in turn dissolved in a nitric acid solution. The process of this invention may be used to replace the above steps by converting the bismuth phosphate carrier containing plutonium into a mixed bismuth-plutonium oxide precipitate as described above, then washing this precipitate to remove excess phosphate ion, and then dissolving said precipitate in a nitric acid solution. The volume of nitric acid required to dissolve the mixed bismuth-plutonium oxides is about the same as that now required to dissolve the lanthanum hydroxide-plutonium carrier. The ratio of plutonium to bismuth in the mixed plutonium-bismuth oxides is about 1 to 3.5, and the concentration of the plutonium in the solution formed by dissolving the mixed oxides in the nitric acid solution is sufficiently high that the plutonium may be precipitated directly from this solution without the necessity of employing a carrier precipitate.

The advantages of the substitution of the process of this invention for the standard cross-over and metathesis steps now employed in the bismuth phosphate-lanthanum fluoride separation process are readily apparent. These include the elimination of the use of the fluoride reagent; the reduction of centrifugations from six to about three or four; a decrease in plutonium losses of between 1 and 2%, achieved by reducing the number of operations; and a decrease in the wear on centrifugation units by eliminating the necessity of separating the flocculent lanthanum fluoride carrier precipitate.

While the preferred modification has been described above, there are many other modifications of the process of this invention possible. Thus, while the conversion of the plutonium from the phosphate to the hydroxide may be carried out as described above with the plutonium a component of a bismuth phosphate carrier precipitate, the process of this invention is equally applicable to the conversion of plutonium phosphate to plutonium hydroxide without a plutonium carrier.

While the exact chemical actions which occur in the various steps of the process of this invention have not been finally determined and there is no intention to be bound by any theory advanced, it is probable that the plutonium and bismuth phosphate dissociate somewhat when introduced into the potassium hydroxide-glycerol solution and the free metal ions form a complex with the glycerol. This action is probably increased by the hydroxide ions introduced as potassium hydroxide, said hydroxide ions increasing the dissociation of the hydroxy groups of glycerol which is a weak acid. The bismuth phosphate-plutonium carrier precipitate is thus completely dissolved through the formation of a metal ion-glycerol complex by mass action. Heating the solution causes the metal ion-glycerol complex to decompose and since the plutonium hydroxide is more insoluble than the plutonium phosphate a precipitate of plutonium and bismuth hydroxides is formed. It can be readily seen that a pure plutonium phosphate may be converted to a plutonium hydroxide as easily without a carrier of bismuth phosphate as with a carrier since plutonium will form a complex with glycerol at low temperatures, and said complex will decompose at higher temperatures. This is shown by Table IV above. Other metals which form complexes with glycerol such as lanthanum, cerium, barium, calcium, magnesium, and manganese, may also be used as carriers for plutonium in carrying out the process of this invention.

Glycerol is only an example of one type of hydroxyl-containing organic compounds which will dissolve bismuth phosphate in the presence of potassium hydroxide and will not reduce bismuth to the metallic state. Tests have shown that members of three general types of organic compounds fulfill these requirements, viz., the polyhydric alcohols, having hydroxy groups on adjacent carbon atoms; poly($\beta$-hydroxyalkyl) amines; and $\alpha$-hydroxy-carboxylic acids. Individual members of the first group which might be substituted include erythritol, xylitol, sorbitol, mannitol, and dulcitol. Many of the sugars, both aldoses and ketoses, in addition to the disaccharide sucrose, may also be used. Examples of the second class include: triethanolamine, and triisopropanolamine. The generally accepted graphic formulas for the complexes these compounds form with bismuth are shown below:

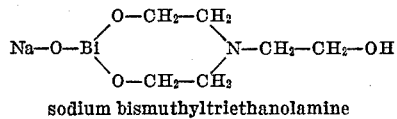
sodium bismuthyltriethanolamine

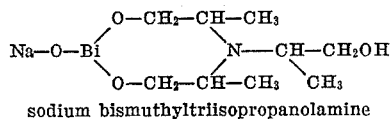
sodium bismuthyltriisopropanolamine

Members of the α-hydroxycarboxylic acids which may be substituted for glycerol include glyceric acid, gluconic acid, and mucic acid.

The source of hydroxide ions in the metathesis solutions is not of critical importance and satisfactory results may be obtained by the use of any of the alkali metal hydroxides. Potassium hydroxide, however, gives somewhat better results than sodium hydroxide.

The use of glycerol and of concentrated nitric acid in this process constitute a possible safety hazard, and every precaution should be observed in the operation of this process to prevent the accidental mingling of these two reagents. While no mixture of glycerol and of concentrated nitric acid is likely to occur in carrying out the process of this invention, as described above, any plant designed to utilize this process should be so constructed so that there can be no accidental mingling of these two reagents. Particular care should be taken in the disposal of wastes.

While there have been described certain embodiments of this invention, it is to be understood that it is capable of many modifications. Changes, therefore, may be made without departing from the spirit and scope of the invention as described in the appended claims in which it is the intention to claim all novelty inherent in the invention as broadly as possible in view of the prior art.

What is claimed is:

1. The method of converting a bismuth phosphate carrier precipitate containing plutonium phosphate into a composition more easily soluble in acid, which comprises dissolving said precipitate in an aqueous medium containing an alkali metal hydroxide and a water-soluble material of the group consisting of: polyhydric alcohols having hydroxy groups on adjacent carbon atoms; poly(β-hydroxyalkyl)amines; and α-hydroxycarboxylic acids; and mixtures thereof, then heating said solution whereby a precipitate containing plutonium is formed.

2. The method of converting a bismuth phosphate carrier precipitate containing plutonium phosphate into a composition more easily soluble in acid, which comprises dissolving said precipitate in an aqueous solution containing an alkali metal hydroxide and a water-soluble polyhydric alcohol having hydroxy groups on adjacent carbon atoms, then heating said solution whereby a plutonium-containing precipitate is formed.

3. The method of converting a bismuth phosphate carrier precipitate containing plutonium phosphate into a composition more easily soluble in acid, which comprises dissolving said precipitate in an aqueous solution containing potassium hydroxide and glycerol, then heating said solution whereby a plutonium-containing precipitate is formed.

4. The method of converting a plutonium carrier precipitate containing plutonium phosphate in which the carrier comprises a metal phosphate in which the metal is a member of the group consisting of bismuth, lanthanum, cerium, barium, calcium, magnesium, and manganese, the steps which comprise dissolving said precipitate in an aqueous solution containing an alkali metal hydroxide and a water-soluble material of the group consisting of: polyhydric alcohols having hydroxy groups on adjacent carbon atoms; poly(β-hydroxyalkyl)amines; and α-hydroxycarboxylic acids; and mixtures thereof, then heating said solution whereby a precipitate containing plutonium is formed.

5. The method of converting a bismuth phosphate carrier precipitate containing plutonium phosphate into a composition more easily soluble in acid, which comprises dissolving said precipitate in an aqueous solution at a tempreature of less than about 50° C. having a concentration of between 2 and 10 M potassium hydroxide and between 0.5 and 7 M glycerol and in which the resultant bismuth concentration is less than about 80 g./l., then heating said solution to a temperature of between about 50° and 100° C. and maintaining said solution at this temperature until precipitation of the plutonium containing precipitate thus formed is substantially complete.

6. The method of converting a bismuth phosphate precipitate containing plutonium phosphate into a plutonium compound more easily soluble in acid which comprises dissolving said precipitate in an aqueous solution having a concentration of approximately 3.5 M potassium hydroxide and 2 M glycerol, the resultant solution containing about 30 g. Bi/l. of solution, then heating said solution to approximately 75° C. and maintaining the solution at this temperature for about two hours, and separating the plutonium-bismuth hydroxide precipitate thus formed.

7. The method of converting a plutonium phosphate into a plutonium compound more soluble in acid, which comprises dissolving said plutonium phosphate in an aqueous solution containing an alkali metal hydroxide and a water-soluble material of the group consisting of: polyhydric alcohols having hydroxy groups on adjacent carbon atoms; poly(β-hydroxyalkyl)amines; and α-hydroxycarboxylic acids; and mixtures thereof, and heating said solution whereby a plutonium hydroxide precipitate is formed.

8. The method of converting a plutonium phosphate into a plutonium compound more soluble in acid, which comprises dissolving said plutonium phosphate in an aqueous solution containing an alkali metal hydroxide and a water-soluble polyhydric alcohol having hydroxy groups on adjacent carbon atoms, and heating said solution whereby a plutonium hydroxide precipitate is formed.

9. The method of converting a plutonium phosphate into a plutonium compound more soluble in acid, which comprises dissolving said plutonium phosphate in an aqueous solution containing potassium hydroxide and glycerol, then heating said solution whereby a plutonium hydroxide precipitate is formed.

10. The method of concentrating plutonium phosphate incorporated in a bismuth phosphate carrier precipitate, which comprises dissolving said carrier precipitate in an aqueous solution containing an alkali metal hydroxide, glycerol, and a soluble arsenite, heating said solution until a bismuth-plutonium hydroxide precipitate is formed, separating said precipitate from said solution and dissolving said precipitate in an inorganic acid solution.

11. The method of concentrating plutonium phosphate incorporated in a bismuth phosphate carrier precipitate, which comprises dissolving said carrier precipitate in an aqueous solution containing from 2 to 10 M KOH, from 0.5 to 7 M glycerol, from 0.05 to 0.2 M sodium arsenite, at a temperature less than about 50° C., heating said solution between 50° and 100° C., until a bismuth-plutonium hydroxide precipitate is formed, separating said precipitate from said solution, washing said precipitate with a potassium hydroxide solution having a concentration between about 5 and about 7 M, and dissolving said precipitate in a nitric acid solution.

12. In a process for separating plutonium from radioactive fission products wherein a bismuth phosphate carrier precipitate containing plutonium is obtained and the precipitate is dissolved, the steps in dissolving said precipitate which comprise dissolving said precipitate in a soluton containing potassium hydroxide and glycerol, forming a hydroxide precipitate containing plutonium in said solution by heating said solution and diluting said solution, then separating said precipitate from the solution and dissolving said precipitate in nitric acid.

13. In a process for separating plutonium from radioactive fission products wherein a bismuth phosphate carrier precipitate containing plutonium is obtained and redissolved in an acid solution, the steps which comprise contacting said precipitate at a temperature below about 50° C. with an aqueous solution containing the following reagents: potassium hydroxide in a concentration between about 2 and 10 M, glycerol in a concentration between about 0.5 and 7 M and a soluble arsenite in a concentration between about 0.05 and 0.2 M, whereby said precipitate is dissolved, heating said solution between 50° and 100° C. until a precipitate is formed, separating said precipitate from solution, washing said precipitate and dissolving said precipitate in an inorganic acid solution.

No references cited.